United States Patent
Park et al.

(10) Patent No.: US 11,221,077 B2
(45) Date of Patent: Jan. 11, 2022

(54) FLOW CONTROL VALVE APPARATUS

(71) Applicants: HYUNDAI MOTOR COMPANY, Seoul (KR); KIA MOTORS CORPORATION, Seoul (KR); GMB Korea Corp., Changwon-si (KR); NTM Co., Ltd., Asan-si (KR)

(72) Inventors: Cheol Soo Park, Yongin-si (KR); Bong Sang Lee, Yongin-si (KR); Jun Sik Park, Seoul (KR); Tae Ho Han, Hwaseong-si (KR); Seok Yoon Chang, Suwon-si (KR); Ho Young Jang, Busan (KR); Jae Sung Bae, Anyang-si (KR); Jae Kyun Cho, Gunpo-si (KR)

(73) Assignees: HYUNDAI MOTOR COMPANY, Seoul (KR); KIA MOTORS CORPORATION, Seoul (KR); GMB Korea Corp., Changwon-si (KR); NTM Co., Ltd., Asan-si (KR)

( * ) Notice: Subject to any disclaimer, the term of this patent is extended or adjusted under 35 U.S.C. 154(b) by 0 days.

(21) Appl. No.: 16/998,065

(22) Filed: Aug. 20, 2020

(65) Prior Publication Data

US 2021/0301932 A1    Sep. 30, 2021

(30) Foreign Application Priority Data

Mar. 25, 2020    (KR) .................. 10-2020-0036029

(51) Int. Cl.
*F16K 5/10*    (2006.01)
*F16K 11/07*    (2006.01)
(Continued)

(52) U.S. Cl.
CPC ............ *F16K 5/10* (2013.01); *F16K 11/0716* (2013.01); *F16K 11/085* (2013.01); *F01P 2007/146* (2013.01); *Y10T 137/88054* (2015.04)

(58) Field of Classification Search
CPC ...... F16K 5/10; F16K 11/0716; F16K 11/085; F16K 11/0743; F16K 2200/202;
(Continued)

(56) References Cited

U.S. PATENT DOCUMENTS 4,187,881 A * 2/1980 Kull ........................ F16K 27/07
137/13
4,219,049 A    8/1980 Skelly
(Continued)

FOREIGN PATENT DOCUMENTS

DE    19632533 C1    10/1997
EP    2713083 A1    4/2014
(Continued)

OTHER PUBLICATIONS

European Search Report dated Feb. 2, 2021 from the corresponding European Application No. 20191512.1, 6 pp.
(Continued)

*Primary Examiner* — Craig J Price
(74) *Attorney, Agent, or Firm* — Lempia Summerfield Katz LLC

(57) ABSTRACT

A flow control valve apparatus switches a circulation direction of cooling medium according to a rotated position of a valve, and a disc provided in the valve controls the flow rate of the cooling medium flowing through a plurality of flow paths, so that the flow rate control of the cooling medium is diversified according to various conditions to improve cooling performance by efficiently circulating the cooling medium.

11 Claims, 7 Drawing Sheets

(51) Int. Cl.
*F16K 11/085* (2006.01)
*F01P 7/14* (2006.01)

(58) Field of Classification Search
CPC .. F16K 2200/204; F16K 99/0013; F01P 7/14; F01P 2007/146; F01P 3/02; F01P 2003/027; F01P 7/16; Y10T 137/88022–88054; Y10T 137/87917; Y10T 137/86533; Y10T 137/86743; Y10T 137/86823; Y10T 137/86839; Y10T 137/86863
USPC .............. 123/41.08, 41.09, 41.1; 236/101 R, 236/101 C; 137/887, 613, 883, 625.31, 137/625.43, 625.46, 614.16–614.2
See application file for complete search history.

(56) References Cited

U.S. PATENT DOCUMENTS

| | | | |
|---|---|---|---|
| 4,425,935 A | 1/1984 | Gonzalez | |
| 5,190,077 A | 3/1993 | Pawelzik et al. | |
| 5,507,315 A * | 4/1996 | Parker | F16K 11/0743 137/625.43 |
| 5,950,576 A | 9/1999 | Busato et al. | |
| 7,163,194 B2 * | 1/2007 | Pervaiz | F16K 5/0478 251/14 |
| 7,168,397 B2 | 1/2007 | Chanfreau et al. | |
| 7,726,266 B2 | 6/2010 | Komurian et al. | |
| 8,281,814 B2 * | 10/2012 | Kim | F16K 11/0743 137/637.3 |
| 8,578,966 B2 * | 11/2013 | Thomas | F16K 11/0787 137/625.17 |
| 8,763,640 B2 * | 7/2014 | Kojima | F16K 11/074 137/625.43 |
| 8,919,378 B2 | 12/2014 | Bartnick et al. | |
| 9,435,248 B2 | 9/2016 | Park et al. | |
| 9,657,464 B2 | 5/2017 | Dunki-jacobs et al. | |
| 9,670,825 B2 | 6/2017 | Murakami et al. | |
| 9,803,759 B2 * | 10/2017 | Bachofer | F16K 27/045 |
| 9,897,217 B2 | 2/2018 | Greene | |
| 9,945,283 B2 * | 4/2018 | Muizelaar | F01P 7/14 |
| 10,151,517 B2 | 12/2018 | Thybo et al. | |
| 10,295,076 B2 * | 5/2019 | Russalian | F01P 7/02 |
| 10,352,460 B2 * | 7/2019 | Jang | F16K 5/201 |
| 10,514,103 B2 * | 12/2019 | Yumisashi | F16K 11/0876 |
| 10,539,064 B2 * | 1/2020 | Sato | F01P 7/14 |
| 10,808,863 B2 * | 10/2020 | Bugeja | F16K 31/535 |
| 10,865,888 B2 * | 12/2020 | Grosskopf | F16K 5/0689 |
| 10,927,972 B2 * | 2/2021 | Murakami | F16K 31/043 |
| 10,968,809 B2 * | 4/2021 | Yoshimura | F16K 5/181 |
| 10,975,975 B2 * | 4/2021 | Sato | F16K 5/0689 |
| 11,098,807 B2 * | 8/2021 | Suzuki | F16K 11/076 |
| 11,098,808 B2 * | 8/2021 | Ozeki | F16K 31/002 |
| 2007/0234979 A1 * | 10/2007 | Pipkorn | F01P 7/167 123/41.08 |
| 2008/0245881 A1 * | 10/2008 | Peric | F16K 3/26 236/93 R |
| 2010/0126612 A1 | 5/2010 | Huang et al. | |
| 2015/0361865 A1 * | 12/2015 | Lee | F01P 7/14 123/41.08 |
| 2016/0003125 A1 * | 1/2016 | Lee | F01P 3/02 123/41.08 |
| 2016/0273671 A1 * | 9/2016 | Chang | F16K 11/0856 |
| 2016/0363236 A1 * | 12/2016 | Smith | F16K 31/12 |
| 2018/0066758 A1 * | 3/2018 | Yumisashi | F16K 27/067 |
| 2018/0149073 A1 * | 5/2018 | Shen | F16K 31/042 |
| 2018/0230891 A1 * | 8/2018 | Sato | F01P 3/02 |
| 2019/0017612 A1 | 1/2019 | Ikemoto et al. | |
| 2019/0072191 A1 | 3/2019 | Shen et al. | |
| 2019/0085987 A1 * | 3/2019 | Grosskopf | F16K 5/0689 |
| 2019/0309862 A1 | 10/2019 | Yu et al. | |
| 2020/0300152 A1 * | 9/2020 | Park | F01M 5/002 |

FOREIGN PATENT DOCUMENTS

| | | |
|---|---|---|
| EP | 3 006 794 A1 | 4/2016 |
| JP | 2017-078341 A | 4/2017 |
| KR | 10-1558377 B1 | 10/2015 |

OTHER PUBLICATIONS

Non Final Office Action cited in U.S. Appl. No. 16/891,855; dated Aug. 17, 2021; 16 pp.

* cited by examiner

FLOW CONTROL VALVE APPARATUS

CROSS REFERENCE TO RELATED APPLICATION

The present application claims priority to and the benefit of Korean Patent Application No. 10-2020-0036029, filed Mar. 25, 2020, the entire contents of which are incorporated herein by reference.

FIELD

The present disclosure relates generally to a flow control valve apparatus selectively switching a plurality of cooling medium flow paths.

BACKGROUND

The statements in this section merely provide background information related to the present disclosure and may not constitute prior art.

Generally, an engine has low fuel efficiency in a cold condition at the beginning of the starting of a vehicle in comparison to a condition in which the engine is sufficiently warmed up. This is because engine friction is large in cold conditions in which the temperature of oil is low, the oil has a high viscosity, heat loss is high through a cylinder wall having low temperature, and the combustion stability is low.

Therefore, in order to improve the fuel efficiency and the engine durability of the vehicle, the temperature of the engine should be rapidly raised to a normal temperature at the beginning of the engine start.

Engine thermal management control refers to a technology that obtains effects of fuel efficiency, output improvement, and emission reduction by using heat generated from the engine during cold starting to warm up the engine. Typically, flow stop valves, clutch type water pumps, electric water pumps, and flow control valves are used for the engine thermal management control.

In the case of the flow stop valves, a controllable valve is provided at an engine outlet or engine supply side to stop flow of engine's cooling water during the engine warm-up thereby the reducing engine warm-up time. The clutch type water pumps and the electric water pumps also realize the engine warm-up rapidly with the same control method.

However, the flow control valves are configured such that, in addition to simply stopping the flow of the cooling water in the engine, the flow rate is variably micro-controlled so that heated cooling water is supplied firstly to an oil warmer or an ATF warmer. Therefore, engine oil, transmission oil, and the temperature of the entire engine can be heated up rapidly at the same time, thereby allowing optimal and fast warm-up.

However, we have discovered that the conventional flow control valve is not configured to separately control the flow rate of cooling water circulated through a cylinder head and a cylinder block, and thus has limitations in improving the cooling efficiency with the circulation of the cooling water.

The foregoing is intended merely to aid in the understanding of the background of the present disclosure, and is not intended to mean that the present disclosure falls within the purview of the related art that is already known to those skilled in the art.

SUMMARY

The present disclosure proposes a flow control valve apparatus, which controls the flow rate of cooling water circulating through a cylinder block and a cylinder head, and in addition, controls the flow rate of cooling water flowing through a plurality of cooling water flow paths.

In one form of the present disclosure, a flow control valve apparatus includes: a housing having a plurality of flow ports and an opening to which a plurality of flow paths may be connected, the plurality of flow paths configured to flow cooling medium; a valve that rotates inside the housing, allows the cooling medium to flow through the plurality of flow paths, and controls a flow of the cooling medium flowing through each flow path of the plurality of flow paths based on a rotated position of the valve; a support mounted to the opening of the housing, and having a plurality of open holes, which may be open while being matched with the plurality of flow paths so that the cooling medium may flow into the housing; a disc arranged between the valve and the support and coupled to the valve, and provided with an opening hole, which may be matched with an open hole of the plurality of open holes of the support, to control a flow rate of the cooling medium that may flow into the housing along the plurality of flow paths based on the rotated position of the valve; and an elastic body provided at the valve or the support to elastically support the disc in a direction opposite to a direction in which the cooling medium may flow through the plurality of flow paths.

The valve may be coupled to a rotating shaft configured to be rotated by receiving power from an actuator, and the support may have a seating portion disposed inside the housing and configured to rotatably support an end of the rotating shaft.

In one form, a flange may be protruded from a circumference of the end of the rotating shaft, or a flange is protruded from a circumference of the seating portion of the support In another form, the elastic body may be interposed between the support and the flange of the rotating shaft or the seating portion and configured to elastically support the disc.

The valve may be provided with an opening part through which the cooling medium of the flow paths may flow, and the disc may be coupled to the opening part to be rotated with the valve.

The disc may be provided with a mounting end that may extend to be inserted into the opening part of the valve and have at least one slit groove extending in an inserting direction at a circumferential surface thereof, and the opening part of the valve may be provided with at least one rotation preventing protrusion on a circumferential surface thereof, the rotation preventing protrusion being inserted into the slit groove.

The support may be configured such that the plurality of open holes may be matched with the opening hole of the disc, and some open holes or all open holes may be configured to continuously communicate with an inside of the housing.

The flow paths may include a first flow path through which cooling water of a cylinder block may flow and a second flow path through which cooling water of a cylinder head may flow, and the open holes of the support may include a first open hole and a second open hole, the first open hole and the second open hole being matched with the first flow path and the second flow path, respectively, and being arranged to be spaced apart from each other.

The first open hole and the second open hole may be respectively provided with a first flow guide and a second flow guide, the first and second flow guides extending toward the disc and being matched with the opening hole of the disc.

A bypass part may be provided in any one of the first and second flow guides or in both the first and second flow guides, the bypass part being partially open at a circumferential surface thereof to continuously communicate with an inside of the housing.

The opening hole of the disc may extend along a rotating direction of the disc from a center of the disc.

The opening hole may have a plurality of support ribs that may be arranged while being spaced apart from each other along an extending direction of the opening hole, the support ribs extending to cross the opening hole in a width direction thereof.

In the flow control valve apparatus having the above-described structure, as the cooling medium flows from the plurality of flow paths to the housing, a circulated direction of the cooling medium is switched according to the rotated position of the valve. Further, as the disc provided in the valve controls the flow rate of the cooling medium flowing through the plurality of flow paths, flow control of the cooling medium is diversified according to various conditions thereby securing cooling performance by efficient circulation of the cooling medium.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
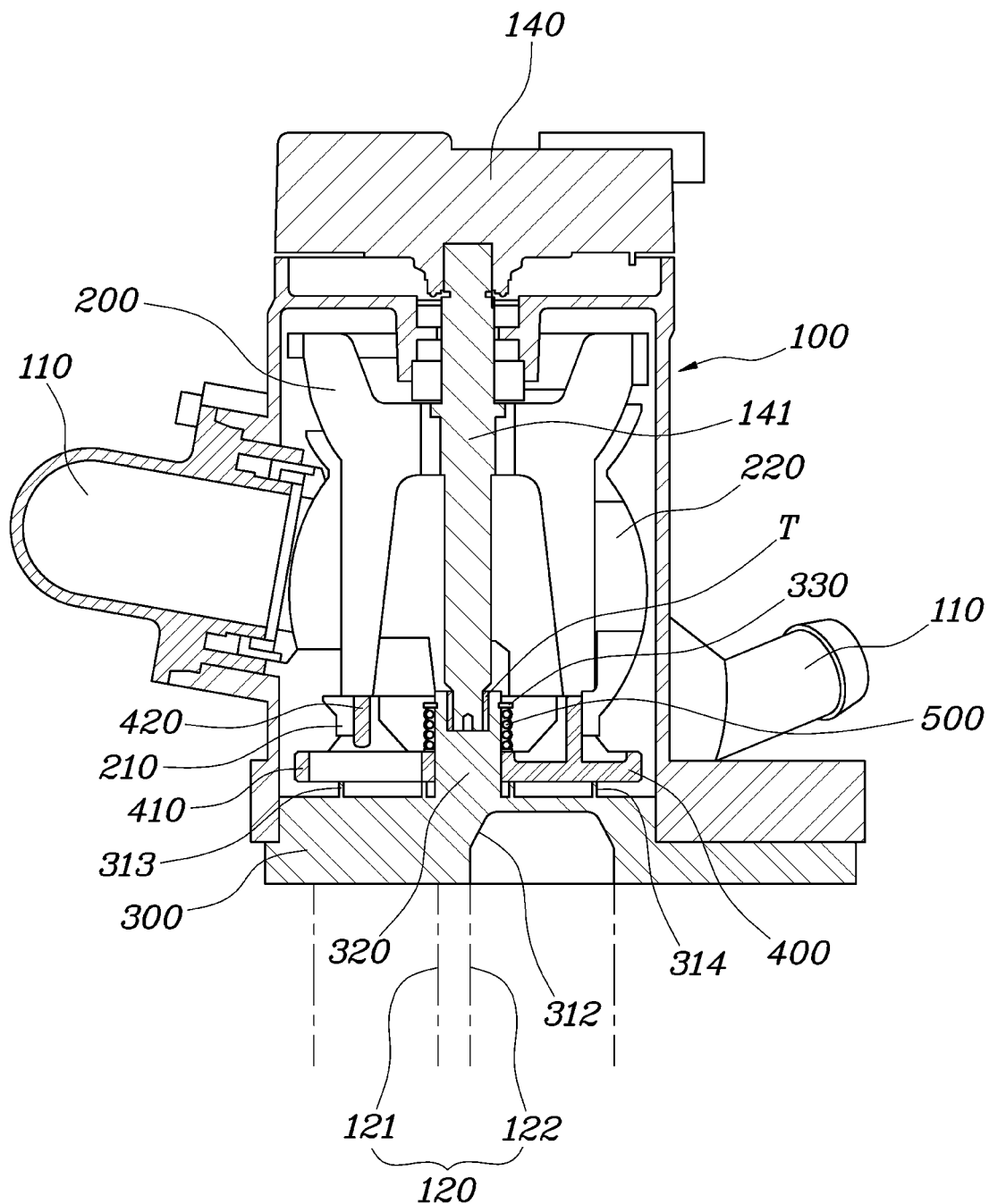
FIG. 1 is a cross-sectional view of a flow control valve apparatus in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, a flow control valve apparatus according to one exemplary form of the present disclosure will be described in detail with reference to the accompanying drawings.

Figure 4:
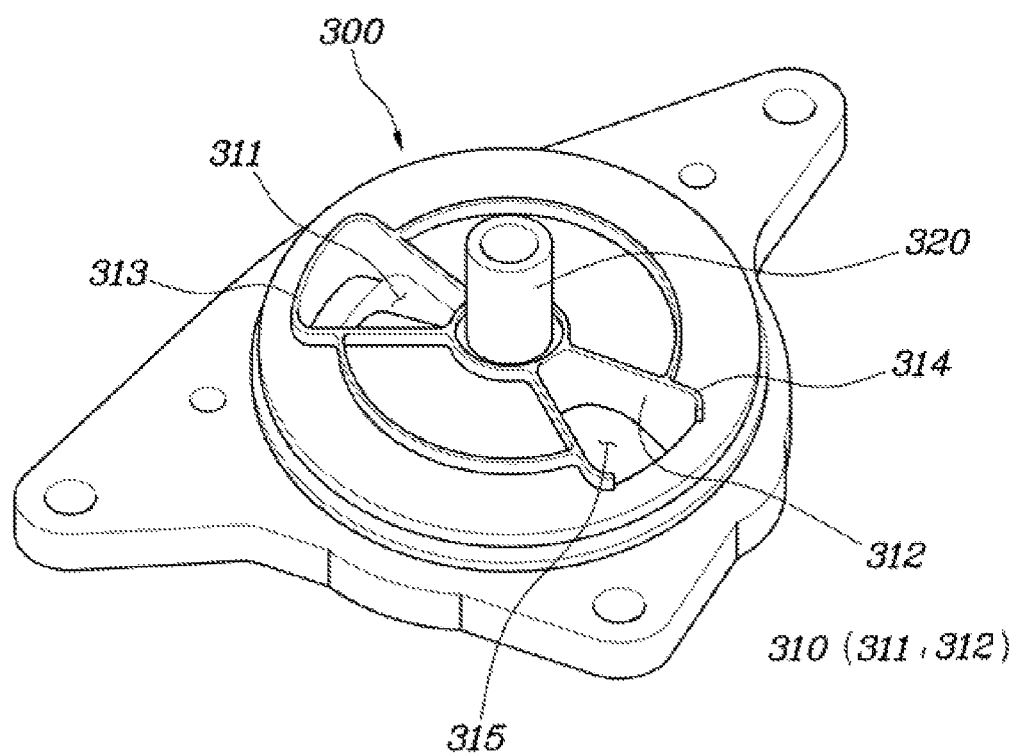
FIG. 4 is a view showing a support of the flow control valve apparatus shown in FIG. 1.
Figure 5:
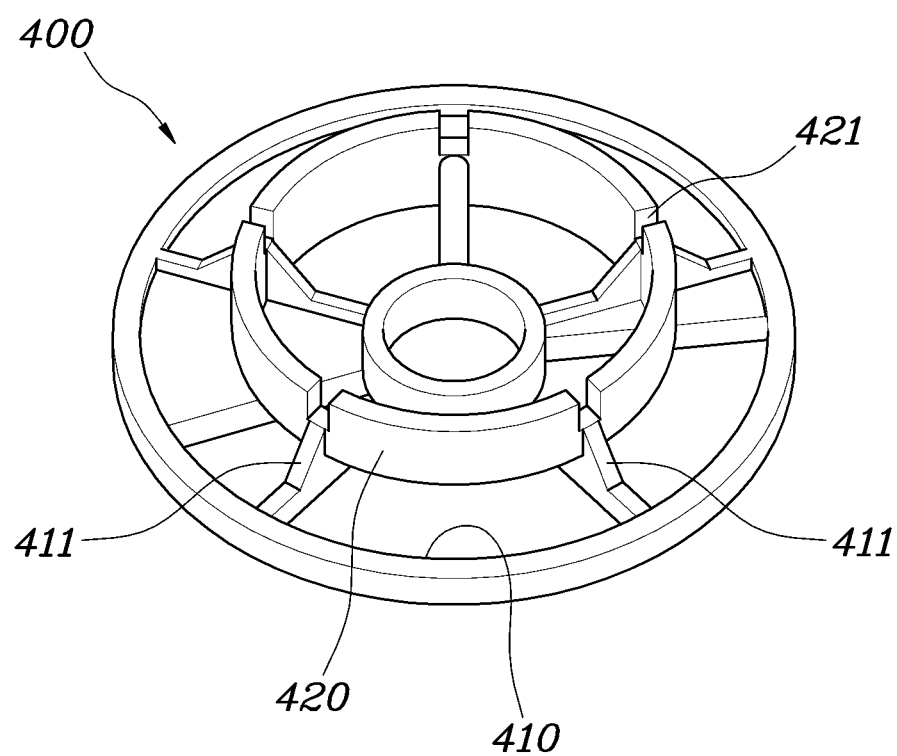
FIG. 5 is a view showing a disc of the flow control valve apparatus shown in FIG. 1.
Figure 6:
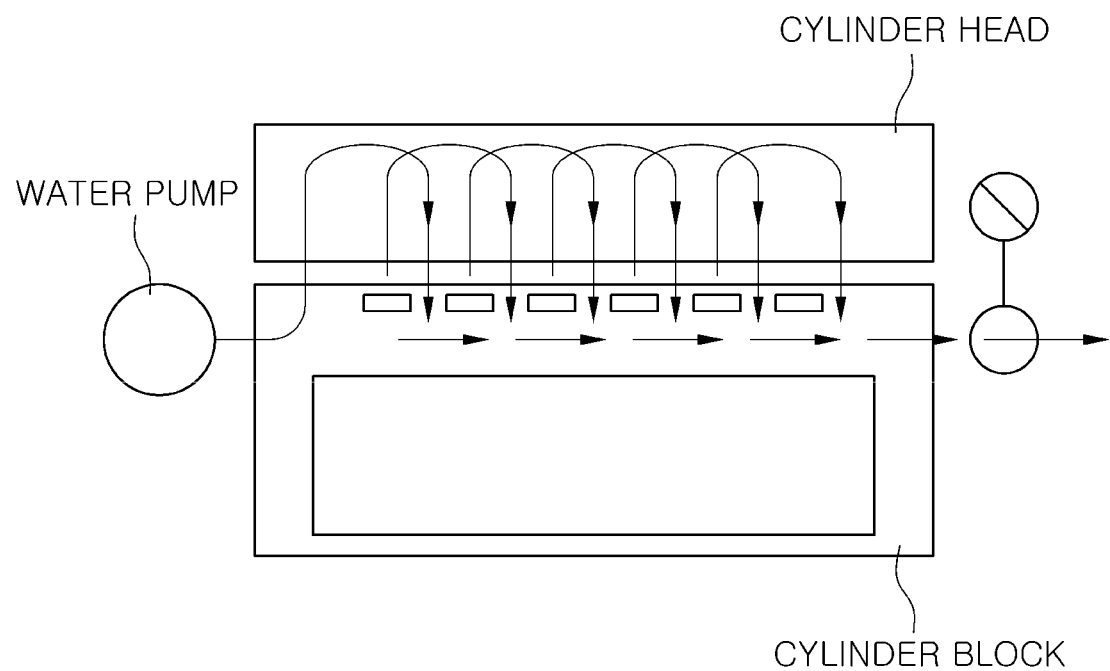
FIG. 6 is a view showing a flow control of cooling medium under a high velocity and high load condition in one form of the present disclosure.
Figure 7:
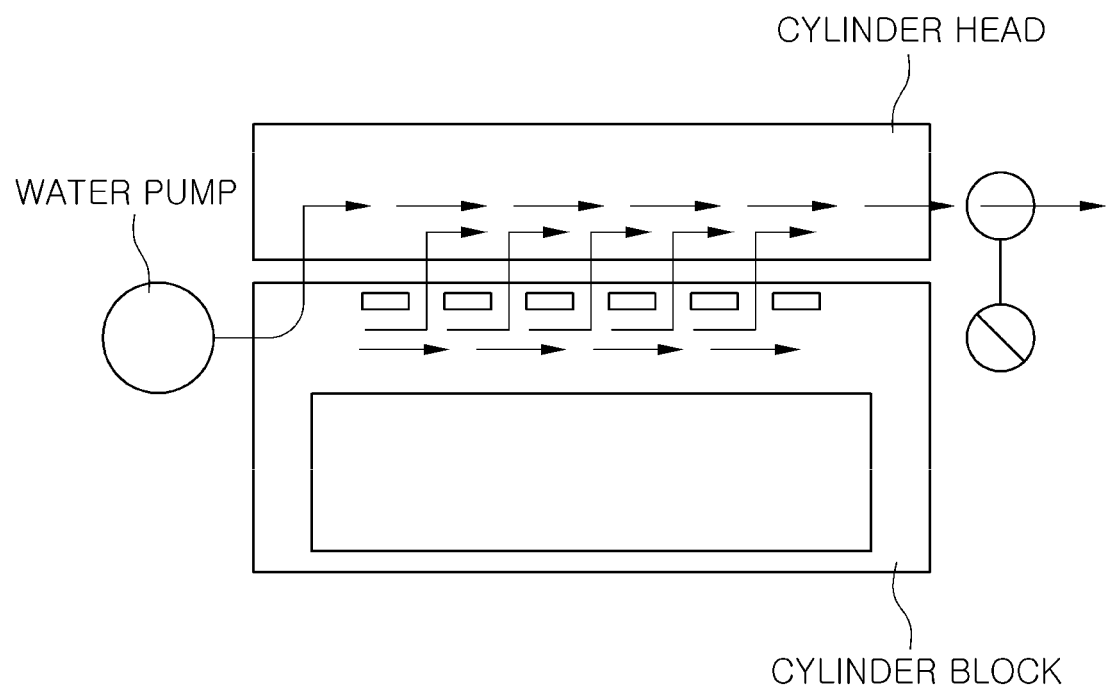
FIG. 7 is a view showing a flow control of cooling medium under a low velocity and low load condition in another form of the present disclosure.

FIG. 1 is a view showing a flow control valve apparatus in one form of the present disclosure, FIGS. 2 to 5 are views showing the flow control valve apparatus shown in FIG. 1, FIG. 6 is a view showing a flow control of cooling medium under a high velocity and high load condition according to another form of the present disclosure, and FIG. 7 is a view showing a flow control of cooling medium under a low velocity and low load condition according to other form of the present disclosure.

Figure 2:
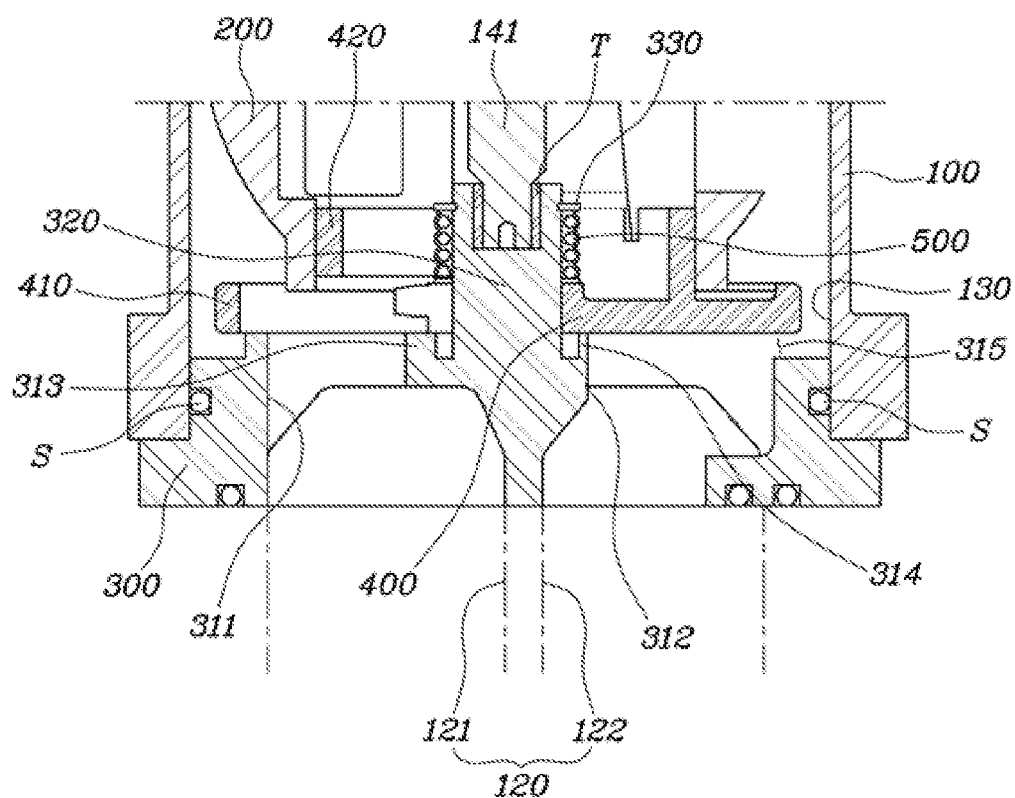
FIG. 2 is a side cross-sectional view showing the flow control valve apparatus shown in FIG. 1.
Figure 3:
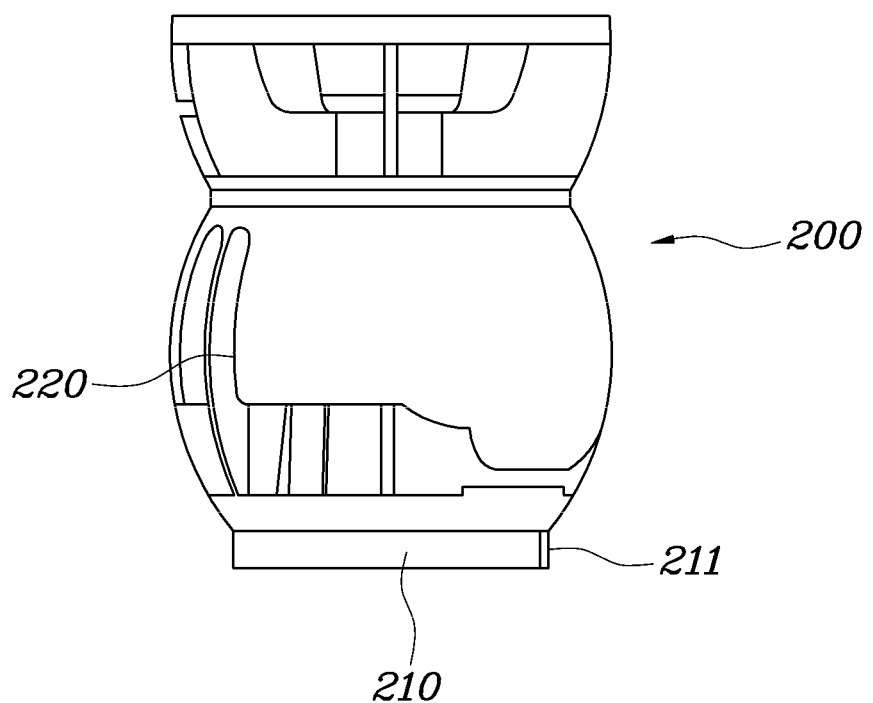
FIG. 3 is a view showing a valve of the flow control valve apparatus shown in FIG. 1.

As shown in FIGS. 1 and 2, the flow control valve apparatus includes: a housing 100 having a plurality of flow ports 110 and an opening 130 to which a plurality of flow paths 120 is connected, the plurality of flow paths 120 being provided for cooling medium to flow from different paths; a valve 200 rotatably provided inside the housing 100, and configured to allow the cooling medium of each of the plurality of flow paths 120 to flow, and to control the flow of cooling medium of each of the plurality of flow ports 110 according to a rotated position thereof; a support 300 mounted to the opening 130 of the housing 100, and having a plurality of open holes 310 (311 and 312) which are open while being patched with the plurality of flow paths 120 so that the cooling medium flows into the housing 100; a disc 400 arranged between the valve 200 and the support 300 and coupled to the valve 200, and provided with opening hole 410, which is matched with the plurality of open holes 310 of the support 300, to control the flow rate of the cooling medium flowing into the housing 100 along the plurality of flow paths 120 according to the rotated position of the valve 200; and an elastic body 500 installed at the valve 200 or the support 300 to elastically support the disc 400 in a direction opposite to a direction in which the cooling medium flows via the plurality of flow paths 120.

As described above, in the flow control valve apparatus of the present disclosure, the valve 200 is rotatably provided inside the housing 100 in which the plurality of flow ports 110 and the plurality of flow paths 120 are connected to each other. Here, the housing 100 has the plurality of flow ports 110 arranged along a circumferential surface thereof, and is provided with an actuator 140 at a first side thereof to rotate the valve 200 and with the opening 130 at a second side thereof, the opening 130 being connected to the plurality of flow paths 120. The valve 200 is coupled to a rotating shaft 141 extending from the actuator 140 and is rotated with the rotating shaft 141 that is rotated when the actuator 140 is operated. The valve 200 may have a plurality of through holes 220 formed on a circumferential surface thereof, the plurality of through holes 220 selectively communicating with the plurality of flow ports 110 according to the rotated position of the valve 200. The valve 200 is coupled with the rotating shaft 141 on a first side thereof and has an opening part 210 on a second side thereof through which the cooling medium of the plurality of flow paths 120 flows. Accordingly, the cooling medium flowing through the plurality of flow paths 120 may be selectively distributed to each flow port of the plurality of flow ports 110 according to the rotated position of the valve 200 and may flow.

In one form, the opening 130 of the housing 100 is provided with the support 300 to which the plurality of flow paths 120 is connected. The support 300 is coupled to the opening 130 of the housing 100 to fix a position thereof, and has the plurality of open holes 310, which are respectively matched with the plurality of flow paths 120, thus allowing the cooling medium flowing through the plurality of flow paths 120 to flow into the housing 100 through the plurality of open holes 310. The support 300 may be provided with sealing members S at portions contacting with the housing 100 and the flow paths 120 thus having air-tightening performance.

The disc 400 is coupled to the opening part 210 of the valve 200 to be rotated with the valve 200. The disc 400 has the opening hole 410 matched with the plurality of open holes 310. Whereby the opening rate between the opening hole 410 and the open holes 310 is controlled according to a rotated position of the disc 400 to control the flow rate of the cooling medium. The disc 400 is rotated with the valve 200, and specifically, is coupled to the opening part 210 of the valve 200 in a slidable manner. Further, the elastic body 500 is provided at the valve 200 or the support 300 to elastically support the disc 400 in the direction opposite to the direction in which the cooling medium flows through the plurality of flow paths 120. As the disc 400 is configured to be moveable at the opening part 210 of the valve 200 with a predetermined gap, the disc 400 may be moved at the opening part 210 by the cooling medium flowing through the plurality of flow paths 120 or elasticity of the elastic body 500.

Therefore, as the disc 400 is brought into close contact with the support 300 by being elastically supported toward the support 300 by the elastic body 500, when the opening hole 410 and the plurality of open holes 310 are matched with each other, the cooling medium may flow smoothly.

Further, when the cooling medium is excessively introduced into the housing through the plurality of flow paths 120, the disc 400 is moved while pushing the elastic body 500 by flow pressure of the cooling medium, so that a gap is generated between the disc 400 and the support 300 and the cooling medium flows into the gap between the disc 400 and the support 300 to decrease the pressure. As described above, even when overpressure is generated due to the excessive inflow of the cooling medium, the gap is provided between the disc 400 and the support 300 by the flow pressure of the cooling medium thus securing a fail-safe which lowers flow resistance.

As described above, the flow rate of the cooling medium flowing into the housing 100 through the plurality of flow paths 120 is controlled by the disc 400 coupled to the valve 200, and the cooling medium is distributed according to the positions of the valve 200 to flow into the plurality of flow ports 110, so that the cooling medium is efficiently circulated by the cooling medium flow rate control suitable for a variety of situations thus securing cooling performance.

In particular, the disc 400 is brought into close contact with the support 300 by the elastic body 500 thus allowing the cooling medium to flow smoothly, and even when overpressure of the cooling medium is applied, the flow resistance is lowered thus securing driving stability.

As shown in FIGS. 1 and 2, the valve 200 is coupled to the rotating shaft 141 rotated by receiving power from the actuator 140 provided in the housing 100. The support 300 may have a seating end 320 (i.e., a seating portion) extending in the housing 100 and in which the rotating shaft 141 is rotatably seated or rotatably supported.

That is, as the rotating shaft 141 is rotatably seated in the seating end 320 of the support 300, a position of an end of the rotating shaft 141 is fixed by the support 300. Accordingly, it is possible to inhibit the rotating shaft 141 from shaking and to allow the position of the valve 200 coupled to the rotating shaft 141 to remain stable. Here, the seating end 320 of the support 300 may be provided with a groove depressed so that the rotating shaft 141 is inserted therein. At a portion where the seating end 320 and the rotating shaft 141 are in contact with each other, a material T may be applied for reducing friction of the contact portion. Typically, Teflon may be used as the material T for reducing friction.

A flange 330 is provided at an end of the rotating shaft 141 or at the seating end 320 of the support 300 by protruding around a circumference of the seating end 320, and the elastic body 500 is interposed between the support 300 and the flange 330 to elastically support the support 300 through the disc 400. The flange 330 may be formed in a flat washer and be provided to protrude around the circumference of the seating end 320 extending from the support 300. Here, as the elastic body 500 is provided between the flange 330 and the support 300 to elastically support the disc 400, the disc 400 pressed by the elastic body 500 is brought into close contact with the support 300. Accordingly, it is possible to allow the cooling medium to flow smoothly when the opening hole 410 of the disc 400 and the plurality of open holes 310 of the support 300 are matched with each other.

The valve 200 is provided with the opening part 210 through which the cooling medium of the flow paths 120 flows, and the disc 400 is coupled to the opening part 210 thereby being rotated with the valve 200. That is, the valve 200 has a round body in which the plurality of through holes 220 is provided around the circumferential surface thereof to selectively communicate with the plurality of flow ports 110. Further, the valve 200 is configured to be coupled with the rotating shaft 141 at the first side of the body and to have the opening part 210 at the second side thereof through which the cooling medium of the plurality of flow paths 120 flows.

The disc 400 is coupled to the opening part 210 of the valve 200 thereby being rotated with the valve 200, and in detail, the disc 400 is coupled to the opening part 210 to be slidable at the opening part 210 in a shaft direction of the valve 200 thereby preventing errors generated during the coupling and rotating of the valve 200 and the disc 400. To this the disc 400 is provided with a mounting end 420 which extends to be inserted into the opening part 210 of the valve 200 and has at least one slit groove 421 extending in an inserting direction at a circumferential surface of the mounting end 420. The opening part 210 of the valve 200 may be provided with at least one rotation preventing protrusion 211 which is provided along a circumferential surface of the valve 200 to be inserted into the slit groove 421.

As described above, the disc 400 is provided with the mounting end 420 inserted into the opening part 210 of the valve 200 thereby securing stable coupling structure between the disc 400 and the valve 200. In particular, the disc 400 and the valve 200 are coupled to each other by the coupling structure in which the rotation preventing protrusion 211 of the valve 200 is inserted into the slit groove 421 of the disc 400, so that the disc 400 and the valve 200 may be rotated together. In addition, as the rotation preventing protrusion 211 of the valve 200 and the slit groove 421 of the disc 400 are formed by extending in a direction in which the mounting end 420 of the disc 400 is inserted into the opening part 210 of the valve 200, the valve 200 and the disc 400 are rotated together and the disc 400 may be moved at the opening part 210 of the valve 200 in the shaft direction thereof.

The support 300 has the plurality of open holes 310 matched with the opening hole 410 of the disc 40, and some of the plurality of open holes 310 or all of the plurality of open holes 310 may be provided to continuously communicate with the inside of the housing 100.

Due to this, when the cooling medium flowing through the plurality of flow paths 120 passes through the plurality of open holes 310 of the support 300, a small flow rate of the cooling medium continuously flows into the housing 100 thereby reducing or inhibiting the errors due to overpressure when the cooling medium flows.

In detail, the plurality of flow paths 120 includes a first flow path 121 through which cooling water of a cylinder block flows and a second flow path 122 through which cooling water of a cylinder head flows. The plurality of open holes 310 of the support 300 may be provided with a first open hole 311 and a second open hole 312, and the first open hole 311 and the second open hole 312 matched with the first flow path 121 and the second flow path 122, respectively, are arranged to be spaced apart from each other.

As described above, as the plurality of flow paths 120 includes the first flow path 121 and the second flow path 122 that are connected to the cylinder block and the cylinder head, respectively, the flow rate of the cooling medium circulated through the cylinder block and the flow rate of the cooling medium circulated through the cylinder head may be controlled according to the rotated position of the disc 400.

The plurality of flow ports 110 of the housing 100 may include a radiator port through which cooling water of a radiator is circulated, an oil port through which cooling water of an oil cooler or oil warmer is circulated, and a heater port through which cooling water of a heater core and an EGR cooler is circulated. In addition, the plurality of flow ports 110 may further include various paths through which vehicle's cooling medium is circulated.

Accordingly, as the support 300 is provided with the first open hole 311 matched with the first flow path 121 and the second open hole 312 matched with the second flow path 122, it is possible to allow the cooling medium flowing through the plurality of flow paths 120 to flow into the housing 100, and to circulate the cooling medium into a path in which cooling is desired according to the position of the valve 200.

As shown in FIG. 4, the support 300 may have a first flow guide 313 and a second flow guide 314, which extend from the first open hole 311 and the second open hole 312 toward the disc 400, respectively, and are matched with the opening hole 410 of the disc 400. The first flow guide 313 and the second flow guide 314 may have the same shapes as circumferential shapes of the first open hole 311 and the second open hole 312, respectively.

The first flow guide 313 and the second flow guide 314 are provided to smooth the flow of the cooling medium passing through the support 300 and flowing toward the disc 400 and the valve 200. Accordingly, the cooling medium flowing through the first flow path 121 is introduced into the first open hole 311 of the support 300 then is guided by the first flow guide 313, thereby being smoothly moved to the opening hole 410 of the disc 400. The cooling medium flowing through the second flow path 122 is introduced into the second open hole 312 of the support 300 then is guided by the second flow guide 314, thereby being smoothly moved to the opening hole 410 of the disc 400.

A bypass part 315 may be provided in any one of the first flow guide 313 and the second flow guide 314 or in both the first flow guide 313 and the second flow guide 314. The bypass part 315 is partially open at a circumferential surface thereof to communicate with the inside of the housing 100.

The bypass part 315 is provided to prevent various error situations by bypassing the cooling medium flowing from the plurality of flow paths 120 into the housing 100.

That is, when the valve 200 is rotated so that the opening hole 410 of the disc 400 and the plurality of open holes 310 of the support 300 are not matched, the flow of the cooling medium is completely shut off, thereby generating problems due to an excessive pressure increase. Further, as the flow pressure of the cooling medium is applied to the disc 400, the disc 400 may not be in close contact with the support 300.

Accordingly, as the bypass part 315 of which the circumferential surface is partially open is provided in any one of the first flow guide 313 and the second flow guide 314 or in both the first flow guide 313 and the second flow guide 314, a small flow rate of the cooling medium flows directly into the housing 100 through the bypass part 315. Due to this, it is possible to prevent errors caused when the overpressure of the cooling medium flowing through the plurality of flow paths 120 occurs, and to prevent permanent opening by which the disc 400 is pushed by the flow pressure of the cooling medium.

As shown in FIG. 5, the opening hole 410 may have a shape formed by extending from the center of the disc 400 along a rotating direction thereof.

The opening hole 410 is provided in the disc 400 by extending from the center of the disc along the rotating direction thereof, when the disc 400 is rotated with the valve 200, are matched with the first open hole 311 or the second open hole 312, so that the opening rate of the first open hole 311 and the second open hole 312 may be controlled. As the opening hole 410 is provided as a single shape and has an extending shape, the flow rate of the cooling medium may be controlled by controlling the opening rate of the first open hole 311 and the second open hole 312, while the first open hole 311 through which the cooling medium circulated through the cylinder block flows and the second open hole 312 through which the cooling medium circulated through the cylinder head flows are continuously opened.

As described above, it is possible to control the flow rate of the cooling medium according to the various driving conditions by controlling the flow rate of the cooling medium circulated through the cylinder block and the cylinder head.

The opening hole 410 may have a plurality of support ribs 411 that are arranged while being spaced apart from each other along an extending direction of the opening hole 410 and extend to cross the opening hole in a width direction thereof. As the plurality of support ribs 411 is arranged at the opening hole 410 of the disc 400 to be spaced apart from each other, it is possible to prevent rigidity degradation due to formation of the opening hole 410 and to secure overall durability of the disc 400. The number and thickness of the plurality of support ribs 411 may be set according to rigidity desired for the disc 400.

The multiway valve 200 apparatus of the present disclosure can perform the control as described below.

As shown in FIG. 6, when a driving condition of a vehicle is under a high velocity and high load condition, the valve 200 is rotated to match the opening hole 410 of the disc 400 with the first open hole 311 of the support 300, thereby securing the opening rate of the first open hole 311. Due to this, the flow rate of the cooling medium of the first flow path 121 connected to the cylinder block is increased, so that the cooling efficiency of the cylinder block is improved thereby providing effects of knocking down and durability improvement.

As shown in FIG. 7, when the driving condition of a vehicle is under a low velocity and low load condition, the valve 200 is rotated to match the opening hole 410 of the disc 400 with the second open hole 312 of the support 300, thereby securing the opening rate of the second open hole 312. Due to this, the flow rate of the cooling medium of the second flow path 122 connected to the cylinder head is increased, so that the cooling efficiency of the cylinder head is improved and thus can be switched to a state suitable for fuel efficient driving.

In addition, as the position of the disc 400 is controlled according to the position of the valve 200, the flow rate of the cooling medium is appropriately controlled according to vehicle's various driving conditions, so that vehicle performance according to cooling efficiency improvement can be improved.

In the multiway valve 200 apparatus configured of the above-described structure, the cooling medium flows from the plurality of flow paths 120 to the housing 100, a circulated direction of the cooling medium is switched according to the rotated position of the valve 200, and the disc 400 provided in the valve 200 controls the flow rate of the cooling medium flowing through the plurality of flow paths 120, so that the flow rate control of the cooling medium is diversified according to the various conditions to improve cooling performance by efficient circulation of the cooling medium.

Although exemplary forms of the present disclosure have been described for illustrative purposes, those skilled in the art will appreciate that various modifications, additions and substitutions are possible, without departing from the scope and spirit of the present disclosure.

What is claimed is:

1. A flow control valve apparatus comprising:
   a housing having a plurality of flow ports and an opening to which a plurality of flow paths is connected, the plurality of flow paths configured to flow cooling medium;
   a valve configured to:
      rotate inside the housing,
      allow the cooling medium to flow through the plurality of flow paths, and
      control a flow of the cooling medium flowing through each flow path of the plurality of flow paths based on a rotated position of the valve;
   a support mounted to the opening of the housing, and having a plurality of open holes, which are open while being matched with the plurality of flow paths so that the cooling medium flows into the housing;
   a disc arranged between the valve and the support and coupled to the valve, wherein the disc is provided with an opening hole, which is matched with an open hole of the plurality of open holes of the support, and configured to control a flow rate of the cooling medium that flows into the housing along the plurality of flow paths based on the rotated position of the valve; and
   an elastic body provided at the valve or the support and configured to elastically support the disc in a direction opposite to a direction in which the cooling medium flows through the plurality of flow paths.

2. The flow control valve apparatus of claim 1, wherein the valve is coupled to a rotating shaft configured to be rotated by an actuator, and the support has a seating portion disposed inside the housing and configured to rotatably support an end of the rotating shaft.

3. The flow control valve apparatus of claim 2, wherein a flange is protruded from a circumference of the end of the rotating shaft or a flange is protruded from a circumference of the seating portion of the support, and the elastic body is interposed between the support and the flange of the rotating shaft or the seating portion and configured to elastically support the disc.

4. The flow control valve apparatus of claim 1, wherein the valve is provided with an opening part through which the cooling medium of the plurality of flow paths flows, and the disc is coupled to the opening part to be rotated with the valve.

5. The flow control valve apparatus of claim 4, wherein the disc is provided with a mounting end that extends to be inserted into the opening part of the valve and has at least one slit groove extending in an inserting direction at a circumferential surface thereof, and the opening part of the valve is provided with at least one rotation preventing protrusion on a circumferential surface thereof, the rotation preventing protrusion being inserted into the slit groove.

6. The flow control valve apparatus of claim 1, wherein open holes of the plurality of open holes of the support are matched with the opening hole of the disc, and configured to continuously communicate with an inside of the housing.

7. The flow control valve apparatus of claim 1, wherein:
   the plurality of flow paths comprise: a first flow path through which cooling water of a cylinder block flows, and a second flow path through which cooling water of a cylinder head flows;
   the plurality of open holes of the support comprise: a first open hole and a second open hole; and
   the first open hole and the second open hole are matched with the first flow path and the second flow path, respectively, and arranged to be spaced apart from each other.

8. The flow control valve apparatus of claim 7, wherein:
   the first open hole and the second open hole are respectively provided with a first flow guide and a second flow guide; and
   the first and second flow guides extend toward the disc and are matched with the opening hole of the disc.

9. The flow control valve apparatus of claim 8, wherein:
   a bypass part is provided in at least one of the first flow guide or the second flow guide; and
   the bypass part is partially open at a circumferential surface thereof and configured to continuously communicate with an inside of the housing.

10. The flow control valve apparatus of claim 1, wherein the opening hole of the disc is configured to extend along a rotating direction of the disc from a center of the disc.

11. The flow control valve apparatus of claim 10, wherein the opening hole has a plurality of support ribs that are arranged while being spaced apart from each other along an extending direction of the opening hole, the support ribs configured to extend to cross the opening hole in a width direction thereof.

* * * * *